United States Patent [19]

Ishibashi et al.

[11] Patent Number: 6,110,406
[45] Date of Patent: Aug. 29, 2000

[54] METHOD FOR PRODUCING MOLDING MATERIAL

[75] Inventors: Hirofumi Ishibashi; Kenzi Hirose, both of Ichihara, Japan

[73] Assignee: Idemitsu Petrochemical Co., Ltd., Tokyo, Japan

[21] Appl. No.: 08/997,725

[22] Filed: Dec. 24, 1997

[30] Foreign Application Priority Data

Dec. 26, 1996 [JP] Japan ................................ 8-348073

[51] Int. Cl.⁷ ........................... B29C 47/88; B29C 71/02
[52] U.S. Cl. ..................... 264/143; 264/237; 264/346; 264/348; 264/177.19; 264/907
[58] Field of Search ................................... 264/143, 148, 264/178 R, 211, 345, 346, 348, 177.19, 902, 907, 237

[56] References Cited

U.S. PATENT DOCUMENTS

| | | |
|---|---|---|
| 5,071,917 | 12/1991 | Pederson et al. . |
| 5,166,238 | 11/1992 | Nakano et al. . |
| 5,183,623 | 2/1993 | Kawaguichi et al. ................. 264/544 |
| 5,264,274 | 11/1993 | Shigeta et al. ........................... 428/284 |
| 5,268,133 | 12/1993 | Cuculo et al. ........................... 264/178 |
| 5,292,587 | 3/1994 | Funaki et al. . |
| 5,405,696 | 4/1995 | Cuculo et al. ........................... 428/364 |
| 5,654,365 | 8/1997 | Havriliak, Jr. et al. . |

OTHER PUBLICATIONS

Macromolecular Physics, vol. 2, Wunderlich, Bernhard, Academic Press 1976, pp. 160–161.

Introduction to Polymers, Young, Robert J., Chapman & Hall 1981, pp. 184–186.

Concise Encyclopedia of Polym. Sci. & Eng., Jacqueline Kroschwitz Ed., John Wiley & Sons 1990, pp. 228–230.

*Primary Examiner*—Jan H. Silbaugh
*Assistant Examiner*—Mark Eashoo
*Attorney, Agent, or Firm*—Oblon, Spivak, McClelland, Maier & Neustadt, P.C.

[57] ABSTRACT

Disclosed is a method for producing a molding material, which comprises melt-extruding a styrenic polymer essentially having a syndiotactic structure or a composition containing the polymer to give strands, then rapidly cooling the resulting strands to thereby make the surface temperature of the strands not higher than the melting point of the styrenic polymer or the composition containing the polymer, and thereafter gradually cooling them to thereby make the surface temperature of the strands not higher than a temperature higher by 20° C. than their glass transition temperature, and finally pelletizing the strands into pellets. The pellets produced have a high degree of crystallinity and can be well molded into good moldings.

20 Claims, No Drawings

METHOD FOR PRODUCING MOLDING MATERIAL

FIELD OF THE INVENTION

The present invention relates to a method for producing a molding material, and, more precisely, to a method for producing a molding material with a high degree of crystallinity, which comprises a styrenic polymer essentially having a syndiotactic structure or comprises a composition containing the polymer.

BACKGROUND OF THE INVENTION

A styrenic polymer essentially having a syndiotactic structure and a composition containing tine polymer, which have been developed recently, are widely known as engineering plastics with good heat resistance and good chemical resistance. The polymer and the composition containing it will be hereinunder referred to as SPS. SPS has various applications in various molding methods. For example, it is molded into films, sheets and the like through extrusion molding.

Extrusion molding of SPS pellets having a low degree of crystallization is problematic in that the SPS pellets as heated at the glass transition temperature of SPS or higher are softened and aggregated in the feed zone near the inlet of the extrusion-molding machine and that the softened pellets adhere to the screws in the extrusion-molding machine and even to the inner wall of the barrel of the machine. As a result, it is often difficult to constantly feed the SPS pellets to the extrusion-molding machine, or as the case may be, the screws are often stopped.

One measure to solve these problems is disclosed in Japanese Patent Application Laid-Open No. 02-194044, in which they say that the SPS pellets to be fed to an extruder shall have a specifically-controlled melt viscosity and a specifically-controlled degree of crystallinity. A method for producing such SPS pellets is disclosed in JP-A 02-194044, which comprises melt-extruding SPS, and then cooling the resulting SPS strands in air or cooling them in water followed by re-heating the resulting SPS pellets.

However, the process comprising the step of cooling the SPS strands in water followed by the step of re-heating the resulting SPS pellets, which is to increase the degree or crystallinity of SPS, is complicated. On the other hand, the process comprising the step of melt-extruding SPS followed by the step of cooling the resulting SPS strands in air is simple, but is problematic in that the SPS strands are often cut in some unsuitable cooling conditions, and that the degree of crystallinity of the SPS pellets obtained often differs or could not be satisfactorily increased, depending on the cooling conditions employed. Thus, in this process, it is difficult to stably produce SPS pellets having a high degree of crystallinity.

Accordingly, it is greatly desired to develop a method for stably and efficiently producing SPS pellets with a high degree of crystallinity that are suitable for molding, especially for extrusion molding.

SUMMARY OF THE INVENTION

The present invention has been made in consideration of the current situation as above, and its object is to provide a method for stably and efficiently producing, in a simplified manner not requiring any complicated operations, SPS pellets with a high degree of crystallinity that are suitable for molding, especially for extrusion molding.

Given that situation, we, the present inventors have assiduously studied and, as a result, have found that, when SPS strands as obtained through melt extrusion of an SPS powder are once rapidly cooled to a specifically-defined temperature and thereafter gradually cooled, then the intended SPS pellets can be stably obtained. On the basis of this finding, the present invention has been completed.

Specifically, the invention provides a method for producing a molding material, which comprises melt-extruding a styrenic polymer essentially having a syndiotactic structure or a composition containing the polymer to give strands, then rapidly cooling the resulting strands to thereby make the surface temperature of the strands not higher than the melting point of the styrenic polymer or the composition containing the polymer and thereafter gradually cooling them to thereby make the surface temperature of the strands not higher than a temperature higher by 20° C. than their glass transition temperature, and finally pelletizing the strands into pellets.

In one preferred embodiment of the method, the strands are rapidly cooled to thereby make the surface temperature of the strands fall within a range between a temperature higher by 80° C. than the glass transition temperature of the styreric polymer or the composition containing the polymer and a temperature lower by 30° C. than the same glass transition temperature. In a more preferred embodiment of the method, the strands are rapidly cooled at a mean cooling rate of not lower than 25° C./sec on the basis of the surface temperature of the strands.

In another preferred embodiment of the method, the rapidly-cooled strands are gradually cooled preferably at a mean cooling rate of not higher than 20° C./sec on the basis of the surface temperature of the strands. In still another preferred embodiment of the method, the rapidly-cooled strands are gradually cooled to thereby make the surface temperature of the strands fall within a range between a temperature of the glass transition temperature of the styrenic polymer or the composition containing the polymer, and room temperature. In still another preferred embodiment of the method, the rapidly-cooled strands are gradually cooled for at least 2 seconds.

In the method of the invention, the strands first rapidly cooled and then gradually cooled may be again rapidly cooled to thereby make their surface temperature not higher than a temperature lower by 20° C. than their glass transition temperature.

PREFERRED MODES OF CARRYING OUT THE INVENTION

Now, the invention is described in detail hereinunder.
1. Styrenic polymer essentially having a syndiotactic structure, or a composition containing the polymer:
(1) Styrenic polymer essentially having a syndiotactic structure:

The syndiotactic structure as referred to herein indicates the stereo-structure of the styrenic polymer, in which the side chains of phenyl groups or substituted phenyl groups are alternately positioned in the opposite sides relative to the main chain composed of carbon-carbon bonds, and its tacticity is determined according to its nuclear magnetic resonance with an isotopic carbon ($^{13}$C-NMR). The tacticity to be determined according to $^{13}$C-NMR indicates the proportion of a plurality of continuous constitutional units in a polymer. For example, a polymer comprising two continuous constitutional units is referred to as a diad; that comprising three continuous constitutional units is referred to as a triad; and that comprising five continuous constitutional units is referred to as a pentad. The styrenic polymer essentially having a syndiotactic structure as referred to herein generally has a racemic diad syndiotacticity of 75% or higher, preferably 85% or higher, or has a racemic pentad syndiotacticity of 30% or higher, preferably 50% or higher, including, for example, polystyrene, poly(alkylstyrenes), poly(halogenostyrenes), poly(halogenoalkylstyrenes), poly(alkoxystyrenes), poly(vinylbenzoates), hydrogenated derivatives of those polymers, their mixtures, and copolymers consisting essentially of those polymers. The poly(alkylstyrenes) include, for example, poly(methylstyrene), poly(ethylstyrene), poly(isopropylstyrene), poly(tertbutylstyrene), poly(phenylstyrene), poly(vinylnaphthalene), poly(vinylstyrene), etc. The poly(halogenostyrenes) include, for example, poly(chlorostyrene), poly(bromostyrene), poly(fluorostyrene), etc. The poly(halogenoalkylstyrenes) include, for example, poly(chloromethylstyrene), etc. The poly(alkoxystyreres) include, for example, poly(methoxystyrene), poly(ethoxystyrene), etc.

Of those styrenic polymers, especially preferred are polystyrene, poly(p-methylstyrene), poly(m-methylstyrene, poly(p-tert-butylstyrene), poly(p-chlorostyrene), poly(m-chlorostyrene), poly(p-fluorostyrene), hydrogenated polystyrene, and copolymers comprising those constitutional units.

The molecular weight of the styrenic polymer for use in the invention is not specifically defined, but its weight-average molecular weight is preferably not smaller than 10,000, more preferably from 50,000 to 1,000,000. The molecular weight distribution of the polymer is not also specifically defined, and the polymer may have any undefined molecular weight distribution. However, styrenic polymers having a weight-average molecular weight smaller than 10,000 are unfavorable, since the thermal properties and the mechanical properties of the composition comprising the polymer and those of tine articles made from the composition are poor.

The method of producing SPS for use in the invention is not specifically defined. For example, styrenic monomers (including their mixtures) corresponding to the intended styrenic polymers may be polymerized or copolymerized optionally along with any other comonomers, in the presence or absence of inert hydrocarbon solvents, using various known catalysts.

(2) Other components except SPS:

In the composition containing SPS of the invention, the amount of SPS may be generally not smaller than 10% by weight, preferably not smaller than 30% by weight, more preferably not smaller than 50% by weight, even more preferably not smaller than 70% by weight. The other components constituting the composition are, for example, as follows:

(a) rubber-like elastic substances:

As rubber-like elastic substances, for example, mentioned are natural rubber, polybutadiene, polyisoprene, polyisobutylene, neoprene, polysulfide rubber, Thiokol rubber, acrylic rubber, urethane rubber, silicone rubber, epichlorohydrin rubber, styrene-butadiene block copolymer (SBR), hydrogenated styrene-butadiene block copolymer (SEB), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isodrene-styrene block copolymer (SIS), hydrogenated styrene-ispprene-styrene block copolymer (SEPS), ethylene-propylene rubber (EPR), ethylenepropylene-diene rubber (EPDM); and core/shell-type, granular elastic substances, such as butadieneacrylonitrile-styrene core/shell rubber (ABS), methylmethacrylate-butadiene-styrene core/shell rubber (MBS), methyl methacrylate-butyl acrylate-styrene core/shell rubber (MAS), octyl acrylate-butadiene-styrene core/shell rubber (MABS), alkyl acrylate-butadiene-acrylonitrilestyrene core/shell rubber (AABS), butadiene-styrene core/shell rubber (SBR), and siloxane-containing core/shell rubbers such as methyl methacrylate-butyl acrylate-siloxane core/shell rubber; and denatured rubbers as prepared by denaturing those rubbers.

Of those, especially preferred are SBR, SEB, SBS, SEBS, SIR, SEP, SIS, SEPS, core/shell rubbers, EPM, EPDM, and denatured rubbers as prepared by denaturing them. One or more of those rubber-like elastic substances can be used herein either singly or as combined.

(b) Thermoplastic resins except SPS:

Any known thermoplastic resins except SPS are usable herein. Concretely mentioned are polyolefinic resins such as linear, high-density polyethylene, linear, low-density polyethylene, high-pressure, low-density polyethylene, isotactic polypropylene, syndiotactic polypropylene, block polypropylene, random polypropylene, polybutene, 1,2-polybutadiene, cyclic polyolefins, poly-4-methylterpene; polystyrenic resins such as polystyrene, HIPS, ABS, As; polyester resins such as polycarbonate, polyethylene terephthalate, polybutylene terephthalate; polyamide resins such as polyamide 6, polyamide 6,6; and polyphenylene ether, polyphenylene sulfide, etc. One or more of those thermoplastic resins can be used herein either singly or as combined.

(c) Inorganic fillers:

Various inorganic fillers are employable herein, including, for example, fibrous, granular and powder ones. The fibrous inorganic fillers include, for example, glass fibers, carbon fibers and whiskers. They may be in any form of fabrics, mats, chopped strands, short fibers and the like, and may also be whiskers themselves. The chopped strands preferably have a length of from 0.05 to 50 mm and a fiber diameter of from 5 to 20 $\mu$m.

The granular or powdery inorganic fillers include, for example, talc, carbon black, graphite, titanium dioxide, silica, mica, calcium carbonate, calcium sulfate, barium carbonate, magnesium carbonate, magnesium sulfate, barium sulfate, oxysulfates, tin oxide, alumina, kaolin, silicon carbide, maetal powder, glass powder, glass flakes, glass beads, etc. Of those inorganic fillers, especially preferred are glass fillers such as glass powder, glass flakes, glass beads, glass filaments, glass fibers, glass rovings and glass mats.

The inorganic fillers are preferably surface-treated with coupling agents or the like to thereby improve their adhesiveness to resins. The coupling agents may be any conventional ones, including, for example, silane-type coupling agents, titanium-containing coupling agents and the like. One or more of those inorganic fillers are usable herein either singly or as combined, if desired.

(3) To shorten the time for crystallization of SPS, a nucleating agent may be added to the styrenic polymer or to the composition containing the polymer. The nucleating agent may be any conventional one, including, for example, metal carboxylates such as aluminium di(p-t-butylbenzoate), metal phosphates such as sodium methylene-bis(2,4-ditbutylphenol) acid phosphate, talc, phthalocyanine derivatives, etc. One or more of those nucleating agents are usable herein either singly or as combined, if desired.

(4) To SPS of the invention, various additives may be added without interfering with the object of the invention. The additives include, for example, antioxidants, nucleating agents, plasticizers, mold lubricants, flame retardants, flame retardant promoters, antistatic agents, etc.

(5) Where various resins and additives are added to SPS of the invention, the method of mixing them is not specifically defined. The order of adding the components to a mixing device, the type of mixing systems to be employed, and other conditions for the method may be suitably determined. If desired, the resulting mixture may be melted and kneaded, and the melt is within the scope of the invention. The method of melting and kneading the mixture is not specifically defined, and any conventional melt-kneading methods are employable herein.

2. Method for producing molding material:

In the invention, the strands as obtained through melt extrusion of SPS are rapidly cooled to thereby make the surface temperature of the strands not higher than the melting point of SPS, then the strands are gradually cooled to thereby make the strands completely not higher than a temperature higher by 20° C. than the glass transition temperature of SPS, and thereafter they are pelletized.

① Melt extrusion of SPS:

In the invention, SPS is heated generally at a temperature not lower than the melting point of SPS, but preferably at a temperature falling between the melting point of SPS and a temperature higher by 100° C. than the melting point, and the resulting SPS melt is extruded into strands. The melt extruder to be employed herein is not specifically defined, and may be any ordinary, single-screw, but preferably double-screw, vented or vent-free extruder that is generally used for melt extrusion of resins.

② Rapid cooling of strands:

In conventional methods, SPS strands as extruded out through the die of an extruder are generally cooled in water. In this rapid cooling step, the SPS strands are entirely cooled to a temperature not higher than the glass transition temperature of SPS. In this, therefore, the SPS strands are solidified to have a low degree of crystallization. Accordingly, the SPS pellets as produced by pelletizing those solidified strands shall naturally have a low degree of crystallization. Apart from this, SPS strands may be gradually cooled in air, whereupon the solidified SPS strands shall surely have a high degree of crystallization. However, the gradual cooling of SPS strands in air to make their temperature not higher than their glass transition temperature takes a lot of time. In addition, where the thus-cooled SPS strands are continuously pelletized using a pelletizer, the cooling time depends on the take-up speed of the pelletizer used and on the distance between the extruder and the pelletizer. Therefore, in this case where the cooling time is long, the take-up speed of the pelletizer must be lowered, or the distance between the extruder and the pelletizer must be prolonged. In order to higher the take-up speed of the pelletizer, the cooling zone must be relatively prolonged, thereby inevitably resulting in that the distance between the extruder and the pelletizer is prolonged. Accordingly, where the SPS melt strands are cooled and pelletized in those conditions, they will dangle without being stretched in the space between the extruder and the pelletizer, and if the worst comes to the worst, they will be cut so that they could not be continuously pelletized. The present invention is free from those problem inevitably occurring in the conventional methods. Specifically, in the method of the invention, the extruded melt strands are rapidly cooled to thereby make their surface temperature not higher than their melting point. In this rapid cooling step, the strands are so cooled that their surface temperature is not higher than the melting point of SPS while their inner temperature is not lower than the melting point of SPS. The thus-cooled strands have a high surface strength and therefore do neither dangle nor cut while they are drawn from the extruder. In the next step, the SPS strands thus rapidly cooled to have the specific temperature distribution as above are gradually cooled, whereby they are wholly crystallized due to their inner heat to have a high degree of crystallization. Thus, in the first cooling step of the invention, the melt strands are rapidly cooled to make their surface temperature not higher than their melting point. In this, preferably, the melt strands are rapidly cooled to thereby make their surface temperature fall within a range between a temperature not higher than their melting point and a temperature not lower than a temperature lower by 30° C. than their glass transition temperature, more preferably, they are rapidly cooled to thereby make their surface temperature fall within a range between a temperature higher by 80° C. than their glass transition temperature and a temperature lower by 10° C. than their glass transition temperature, even more preferably, within a range between a temperature higher by 50° C. than their glass transition temperature and their glass transition temperature. In this rapid cooling step, the strands are generally cooled at a mean cooling rate of not lower than 25° C./sec, preferably falling between 50 and 300° C./sec or so, more preferably falling between 100 and 250° C./sec, on the basis of the surface temperature of the strands. If the cooling rate is lower than 25° C./sec, the strands will be cooled not only on their surface but also even in their inside, resulting in that they could no more be crystallized even though they are further gradually cooled in the next step. On the other hand, the mean cooling rate of higher than 300° C./sec is unfavorable, since the surface temperature of the strands being cooled at such a high cooling rate is difficult to control and since some special cooling equipment is needed. The mean cooling rate as referred to herein is obtained by dividing the difference between the temperature at which the cooling is started and the temperature at which the cooling as finished, by the cooling time.

The means of rapidly cooling the melt strands to be employed herein is not specifically defined, and may be any and every ordinary one that is generally used for cooling melt strands. For example, for this, employable is any of water bathes, hot water bathes, oil bathes, air cooling devices, etc. The preferred cooling means varies, depending on the type of SPS constituting the strands to be cooled. Preferably used is hot or lukewarm water having a temperature falling between 40 and 90° C. or so, desirably between 50 and 70° C. or so. If the temperature of water used for the cooling is lower than 40° C., it is difficult to control the surface temperature of the strands being cooled. If so, therefore, the strands well be cooled not only on their surface but also even in their inside, resulting in that they could no more be crystallized even though they are further gradually cooled in the next step. On the other hand, if the temperature of water used for the cooling is higher than 90° C., the surface temperature of tine strands being cooled would be lowered insufficiently, often resulting in that the resulting strands will dangle or cut in the next gentle cooling step.

③ Gentle cooling of strands:

The strands thus rapidly cooled in the previous step are then gradually cooled in the next gentle cooling steps in which the strands are entirely cooled and SPS constituting those strands is crystallized.

The strands that have been rapidly cooled in the previous step to thereby make their surface temperature not higher than the melting point of SPS are further cooled in tine next gentle cooling step, thereby making their temperature not higher than a temperature higher by 20° C. than the glass transition temperature of SPS, preferably making their temperature fall between a temperature higher by 10° C. than the glass transition temperature of SPS and room temperature, more preferably between the glass transition temperature of SPS and 50° C. If the surface temperature of the strands thus gradually cooled in this step is higher by 20° C. than the glass transition temperature of SPS, the strands could not be pelletized well in the next pelletizing step.

As has been mentioned hereinabove, the inner temperature of the strands being cooled is higher than the surface temperature thereof so that the crystallization of SPS constituting the strands is promoted by the inner heat of the strands. Therefore, the surface temperature of the strands that have been gradually cooled in this gentle cooling step may often be higher than that of the strands that have just been rapidly cooled in the previous step. Needless-to-say, this embodiment is within the scope of the invention. In this gentle cooling step, the strands may be gradually cooled at a mean cooling rate falling between −10 and 20° C./sec, preferably between −5 and 15° C./sec, more preferably between 1 and 10° C./sec, even more preferably between 2 and 6° C./sec, on the basis of the surface temperature of the strands being cooled. If the mean cooling rate is higher than 20° C./sec, the strands will be entirely cooled to their glass transition temperature before they are fully crystallized. If so, the degree of crystallinity of the thus-cooled strands is not satisfactorily increased. On the other hand, even if the mean cooling rate is lower than −10° C./sec, the degree of crystallinity of the cooled strands is no more increased over the intended value. The mean cooling rate as referred to herein is obtained in the same manner as above. In one embodiment of gradually cooling the strands at the defined mean cooling rate, for example, the rapidly-cooled strands are taken up, using an ordinary take-up device, while being spontaneously cooled in air or being forcedly cooled with an air blow applied thereto.

Preferably, in the gentle cooling step of the invention, the strands are gradually cooled for at least 2 seconds or so, preferably for 3 to 30 seconds or so, more preferably for 4 to 10 seconds or so. If the gentle cooling time is shorter than 2 seconds, SPS having a sufficiently increased degree of crystallinity could not be obtained. The gentle cooling time may be controlled by suitably varying the gentle cooling distance, or that is, the distance between the rapid cooling device and the pelletizer within which the strands are moved prior to being pelletized, and the take-up speed of the pelletizer.

④ Pelletization of strands:

The strands thus fully crystallized in the previous gentle cooling step are directly, or after having been again rapidly cooled, pelletized into pellets in any known manner, for example, using an ordinary pelletizer. In the case of having been again rapidly cooled before being pelletized, the strands have been preferably cooled to make their surface temperature at least not higher than a temperature lower by 20° C. than their glass transition temperature. Optionally, the strands may be again rapidly cooled for the following reasons: In general, when the temperature of the strands is lowered to be not higher than their glass transition temperature, the strands are usually no more crystallized. Therefore, even though the strands that have been lowered to a temperature not higher than their glass transition temperature are further gradually cooled, the degree of crystallization of the resulting pellets would no more differ so significantly, and there is no necessity for the additional gentle cooling of the strands. Contrary to this, however, if the strands that have been rapidly cooled and then gradually cooled are again rapidly cooled, the necessary gentle cooling distance can be shortened. Accordingly, this additional rapid cooling that may be effected optionally is irrelevant to the first rapid cooling that is indispensable in the invention, and the means of the additional rapid cooling is no specifically defined. The cooling rate of the additional rapid cooling may be either higher or lower than that of the indispensable rapid cooling. Preferably, the additional rapid cooling may be effected in water.

According to the method of the invention described in detail hereinabove, stably obtained are SPS pellets having a high degree of crystallization of not lower than 15%, especially not lower than 20%, more especially no. lower than 30%. Even when heated at their glass transition temperature or higher in a molding machine, especially in an extrusion-molding machine from which they are melt-extruded to be molded, those SPS pellets are not softened but are directly heated up to their melting point or higher and are thus melted. Accordingly, the SPS pellets are free from the problems that they are aggregated in the feed zone near the inlet of the extrusion-molding machine and they adhere to the screws in the extrusion-molding machine or even to the inner wall of the barrel of the machine. Thus, the molding material comprising those SPS pellets is good.

Now, the method for producing the molding material of the invention is described in more detail with reference to the following Examples, which, however, are not intended to restrict the scope of the invention.

PRODUCTION EXAMPLE 1: PRODUCTION OF SPS 1.0 liver of pure styrene and 1 mols of triethyl aluminium were put into a 2-liter reactor, and heated at 75° C., to which was added 16.5 ml of a pre-mixing catalyst (comprised of 90 $\mu$mols of pentamethylcyclodentadienyl titanium trimethoxide, 90 $\mu$mols of dimethylanilinium tetrakis (pentafluorophenyl) borate, 29.1 mmols of toluene, and 1.8 mmols of triisobutyl aluminium), and the monomer was polymerized therein at 75° C. for 4.8 hours. After the reaction, the product was repeatedly washed with methanol, and dried to obtain 380 g of a polymer.

The above production process was repeated to obtain more than 20 kg of the polymer.

The weight-average molecular weight of the polymer was measured through gel permeation chromatography at 130° C., using a solvent of 1,2,4-trichlorobenzene, to be 272,000. From its melting point and $^{13}$C-NMR data, the polymer was identified as SPS.

EXAMPLE 1

The SPS powder as obtained in Production Example 1 was melt-extruded through an extruder TEX30 (manufactured by Nippon Steel Works, Co.—this rotates at 200 rpm). For the extrusion, the amount of the SPS powder charged was 20 kg/hr, the take-up rate of the SPS strands formed was 1 m/sec, and the die temperature was 300° C. The strands as extruded out through the die were dipped in a water bath at 60° C. for 1 second, and thereafter stretched in air at 25° C. for 5 seconds. The surface temperature of the strands just drawn up from the water bath was 115° C., and that of the strands after having been stretched in air for 5 seconds was 95° C. From those data, it is known that the mean cooling rate of the surface of the strands being cooled in the water bath was 185° C./sec. The mean cooling rate of the surface of the strands being gradually cooled in air was 4° C./sec. Next, the strands were again dipped in the water bath, whereby they were further cooled to 70° C., and thereafter they are pelletized into pellets, using a pelletizer. The SPS pellets thus obtained had a degree of crystallization of 30%.

These pellets were sheeted into sheets, whereupon they were not aggregated in the hopper and also near the screws in the sheeting machine, and they were smoothly and stably fed into the sheeting zone to give good sheets. During the sheeting operation, the amount of the pellets being extruded out did not vary, and the pellets were continuously sheeted into good sheets of which the thickness was uniform in the machine direction.

EXAMPLE 2

In the same manner as in Example 1, except that the strands that had been gradually cooled were further cooled in air to 90° C. in place of being cooled in water to 70° C., the strands were pelletized into pellets, using a pelletizer. The SPS pellets obtained herein had a degree of crystallinity of 35%.

Like those in Example 1, the pellets were also stably sheeted into good sheets.

EXAMPLE 3

The pellets as obtained in Example 1 were fed into a stirred hopper (manufactured by Kawata Co.—tails has an inner volume of 70 liters) at a feeding rate of 10 kg/hr, into which was introduced hot nitrogen gas heated at 150° C. at a flow rate of 2.4 Nm$^3$/hr to heat the pellets therein. After having been heated for 20 minutes, the pellets were sampled out through the sampling valve, and their degree of crystallinity was measured to be 35%.

Like those in Example 1, the pellets obtained herein were also stably extruded out and sheeted into good sheets.

COMPARATIVE EXAMPLE 1

The SPS strands were dipped in a water bath at 30° C. for 10 seconds and then directly pelletized into pellets, using a pelletizer. In this process, the surface temperature of the strands just having been drawn us from the water bath was 70° C. From those data, it is known that the mean cooling rate of the surface of the strands in the water bath was 23° C./sec. The SPS pellets thus produced had a degree of crystallinity of 10%.

Those pellets were sheeted using a sheeting machine in which, however, the pellets were partly aggregated around the screws and above them so that it was difficult to constantly feed the pellets. The sheets thus produced had streaks on their surface.

As has been described in detail hereinabove, the method of the invention, which is characterized in that SPS strands are rapidly cooled to a specific temperature and thereafter gradually cooled, stably and efficiently produces SPS pellets having a high degree of crystallinity. The SPS pellets thus produced by the method of the invention are good molding materials for, for example, extrusion molding Where the SPS pellets are molded through an extrusion-molding machine, they are not aggregated in the hopper and even near the screws in the machine, and tone machine is smoothly run to give good moldings.

While the invention has been described in detail and with reference to specific embodiments thereon, it will be apparent to one skilled in the art that various changes and modifications can be made therein without departing from the spirit and scope thereof.

What is claimed is:

1. A method for producing a molding material, which comprises melt-extruding a composition comprised of a styrenic polymer essentially having a syndiotactic structure to give strands, then rapidly cooling the strands at a mean cooling rate of not lower than 25° C./sec to thereby cause $T_s \leq T_m$, wherein $T_m$ is the melting point temperature of the polymer and $T_s$ is the surface temperature of the strands, and thereafter gradually further cooling the rapidly-cooled strands at a mean cooling rate of not higher than 20° C./sec for 2 to about 30 seconds, to thereby cause $T_s \leq T_g + 20°$ C., wherein $T_g$ is the glass transition temperature of the polymer, thereby crystallizing the strands to a degree of crystallization of not lower than 15%, and pelletizing the crystallized strands into pellets, wherein said pellets have a degree of crystallization of not lower than 15%.

2. The method for producing a molding material as claimed in claim 1, wherein the strands are rapidly cooled to thereby make $(T_g - 30°$ C.$) < T_s < (T_g + 80°$ C.$)$.

3. The method for producing a molding material as claimed in claim 2, wherein the rapidly-cooled strands are gradually cooled to thereby make $T_m < T_s < T_g$, wherein $T_m$ denotes room temperature.

4. The method for producing a molding material as claimed in claim 2, wherein the strands are rapidly cooled to thereby make $(T_g - 10°$ C.$) < T_s < (T_g + 80°$ C$)$.

5. The method for producing a molding material as claimed in claim 4, wherein the strands are rapidly cooled to thereby make $T_g < T_s < (T_g + 80°$ C.$)$.

6. The method for producing a molding material as claimed in claim 1, in which the rapidly-cooled strands are gradually cooled to thereby make $T_m < T_s < T_g$, wherein $T_m$ denotes room temperature.

7. The method for producing a molding material as claimed in claim 1, wherein the strands are rapidly-cooled at a mean cooling rate of between about 50–300° C./sec.

8. The method for producing a molding material as claimed in claim 1, wherein the strands are gradually-cooled at a mean cooling rate of between about 1–10° C./sec.

9. The method for producing a molding material as claimed in claim 1, wherein the strands are rapidly cooled to thereby make $(T_g - 30°$ C.$) \leq T_s \leq T_m$.

10. The method for producing a molding material as claimed in claim 1, wherein the rapidly-cooled strands are gradually cooled for at least 2 seconds.

11. The method for producing a molding material as claimed in claim 10, wherein the rapidly-cooled strands are gradually cooled for between 3–30 seconds.

12. A method for producing a molding material, which comprises melt-extruding a composition comprised of a styrenic polymer essentially having a syndiotactic structure to give strands, then rapidly cooling the strands in water to thereby cause $T_g \leq T_s \leq T_m$, wherein $T_g$ is the glass transition temperature of the polymer, $T_s$ is the surface temperature of the strands, and $T_m$ is the melting point temperature of the polymer, and thereafter gradually further cooling the rapidly-cooled strands for 2 to about 30 seconds to thereby cause $T_m < T_s < T_g$, wherein $T_m$ denotes room temperature, thereby crystallizing the strands to a degree of crystallization of not lower than 15%, and pelletizing the crystallized strands into pellets, wherein said pellets have a degree of crystallization of not lower than 15%.

13. The method for producing a molding material as claimed in claim 12, wherein the strands are rapidly cooled at a mean cooling rate of not lower than 25° C./sec on the basis of the surface temperature of the strands.

14. The method for producing a molding material as claimed in claim 12, wherein the rapidly-cooled strands are gradually cooled at a mean cooling rate of not higher than 20° C./sec on the basis of the surface temperature of the strands.

15. The method for producing a molding material as claimed in claim 14, wherein the rapidly-cooled strands are gradually cooled for at least 2 seconds.

16. The method for producing a molding material as claimed in claim 14, wherein the gradually-cooled strands are again rapidly cooled to thereby make $T_s \leq T_g - 20°$ C.

17. The method for producing a molding material as claimed in claim 12, wherein the rapidly-cooled strands are gradually cooled such that $50°$ C.$< T_s < T_g$.

18. The method for producing a molding material as claimed in claims 12, wherein the rapidly-cooled strands are gradually cooled for at least 2 seconds.

19. The method for producing a molding material as claimed in claim 18, wherein the rapidly-cooled strands are gradually cooled for between 3–30 seconds.

20. The method for producing a molding material as claimed in claim 19, wherein the rapidly cooled strands are gradually cooled for between 4–10 seconds.

* * * * *

UNITED STATES PATENT AND TRADEMARK OFFICE
CERTIFICATE OF CORRECTION

PATENT NO. : 6,110,406

DATED : August 29, 2000

INVENTOR(S): Hirofumi Ishibashi

It is certified that an error appears in the above-identified patent and that said Letters Patent is hereby corrected as shown below:

On the Title page, the CPA information has been omitted. It should read as follows:

---[45] **Date of Patent: *Aug. 29, 2000** ---

---[ * ] Notice: This patent issued on a continued prosecution application filed under 37 CFR 1.53 (d), and is subject to the twenty year patent term provisions of 35 U.S.C 154 (a)(2).

Signed and Sealed this

Twenty-ninth Day of May, 2001

*Attest:*

NICHOLAS P. GODICI

*Attesting Officer*     Acting Director of the United States Patent and Trademark Office